United States Patent

Holmes

[11] Patent Number: 5,855,470
[45] Date of Patent: Jan. 5, 1999

[54] WIND WHEEL WITH ROTATIONALLY FACED PLATES

[76] Inventor: Alan G. Holmes, 1610 Mercury St., Merritt Island, Fla. 32953

[21] Appl. No.: 828,259

[22] Filed: Mar. 21, 1997

[51] Int. Cl.$^6$ .................................................. F03D 7/06
[52] U.S. Cl. ............... 416/11; 416/17; 416/119; 416/170 R; 415/4.2; 415/4.3; 415/124.1
[58] Field of Search ...................... 416/117, 119, 416/17, 11, 170 R; 415/4.2, 4.3, 4.4, 4.5, 122.1, 124.1

[56] References Cited

U.S. PATENT DOCUMENTS

| | | |
|---|---|---|
| 69,374 | 10/1867 | Thornton . |
| 715,480 | 12/1902 | Hudspith . |
| 1,154,930 | 9/1915 | Might ........................................ 416/17 |
| 1,618,549 | 2/1927 | O'Toole . |
| 1,790,175 | 1/1931 | Spencer . |
| 4,467,218 | 8/1984 | Andruszkiw et al. ..................... 290/54 |
| 4,507,049 | 3/1985 | Strandgren ................................ 416/51 |
| 4,609,827 | 9/1986 | Nepple .................................... 416/119 |
| 4,678,394 | 7/1987 | Willoughby ............................. 415/2 R |
| 5,348,443 | 9/1994 | Roberts . |
| 5,472,311 | 12/1995 | Davis ....................................... 415/4.1 |

FOREIGN PATENT DOCUMENTS 2291379 11/1976 France .
57-186069 11/1982 Japan .
61-38171 2/1986 Japan .

Primary Examiner—Thomas E. Denion
Assistant Examiner—Richard Woo
Attorney, Agent, or Firm—Edward M. Livingston, Esq.

[57] ABSTRACT

This invention accomplishes these and other objectives with a wind wheel (1) having at least one planetary gear wheel (10) affixed rigidly to a wind-wheel axle (2) from which gear trains for each of a plurality of wind-wheel plates (9) are rotated to maximum plate frontage in wind flow (30) by gear belts (21) intermediate the gear trains and axes of the plurality of wind-wheel plates. The gear trains each have a second gear wheel (12) with a 0.50-to-1.0 gearing ratio to the planetary gear, a third gear wheel (15) with a 2.0-to-1.0 gearing ratio to the planetary gear, a first gear-belt wheel (18) extended concentrically from a side of the third gear wheel and having a 0.60-to-1.0 gearing ratio to the planetary gear and, a second gear-belt wheel (20) having a gearing ratio that is equal to the first gear-belt wheel. The plurality of wind-wheel plates with corresponding drive trains is preferably six but can be any number appropriate for design preferences. The wind wheel can be structured with either a horizontal axis or a vertical axis with appropriate structural modifications. Directional control can be provided by eccentric positioning of the wind-wheel axis in order for the wind-wheel plates to have a weather-vane effect.

15 Claims, 4 Drawing Sheets

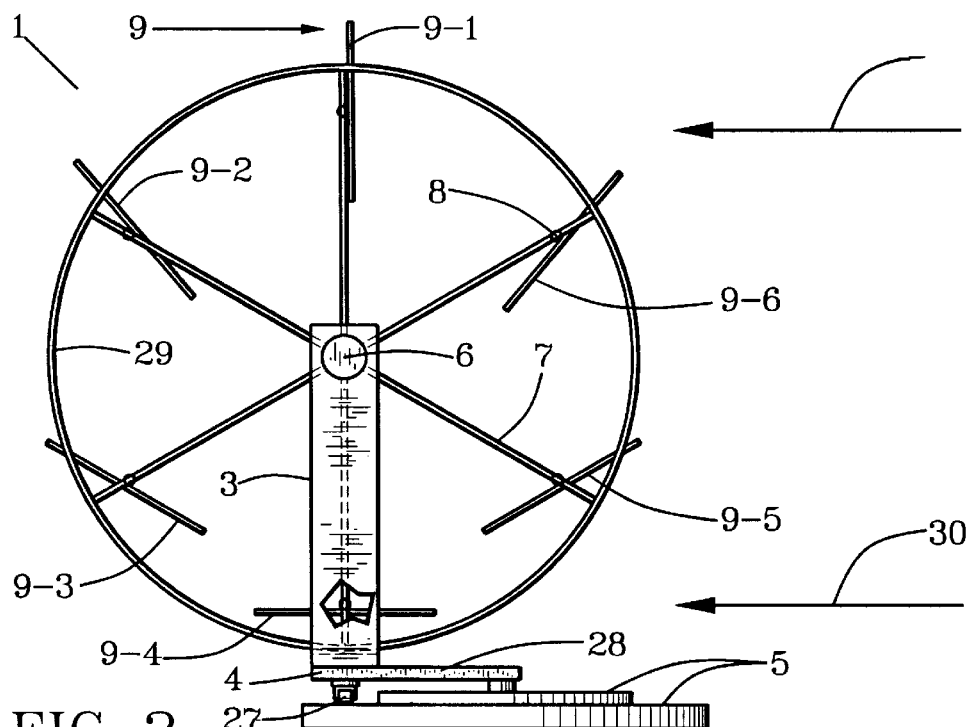
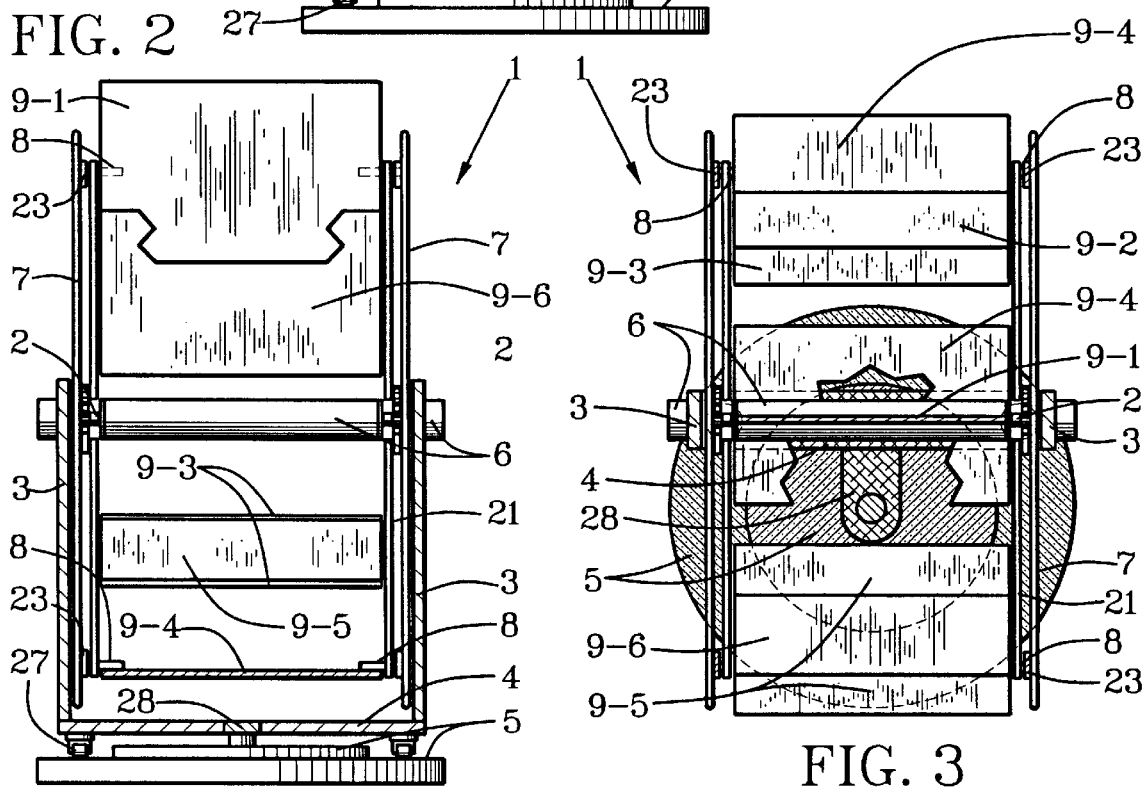
FIG. 1
FIG. 2
FIG. 3

_5,855,470_

WIND WHEEL WITH ROTATIONALLY FACED PLATES

BACKGROUND OF THE INVENTION

This invention relates to wind wheels and in particular to wind wheels having paddle plates which are rotated to face wind in wind-direction travel and rotated edgewise in windward travel circumferentially.

For centuries ways have been sought and devised to make paddle plates of a wind wheel face wind in its direction of travel and avoid facing the wind in return portions of rotational travel. None, however, have provided the wind-use efficiency and low cost of rotational facing of paddle plates to face wind in a manner taught by this invention.

Different but related wind wheels are described in the following patent documents. U.S. Pat. No. 4,507,049, issued to Strandgren, taught a wind wheel with wing-shaped paddles that were positioned to utilize air foil for rotation. Japanese Patent Disclosure Number 57-186069, dated Nov.16, 1982, described a wind wheel with paddle plates rotated by shafts extended from a worm type of planetary gear. Japanese Patent Number 61-38171, issued on Feb.24, 1986 taught a hydraulic means for positioning wind buckets or paddles in and out of the path of wind in rotational travel of a wind wheel. French Patent Number 2,291,379 taught a wind turbine with wing-shaped airfoils that were rotated with central gearing from-foil-to-foil for positioning the airfoils optimally for utilization of air current to rotate the wind turbine. U.S. Pat. No. 1,790,175, issued to Spencer, described a wind wheel with paddle plates rotated by shafts extended from a worm type of planetary gear in a slightly different manner than taught by the above Japanese Patent Disclosure Number 57-186068. U.S. Pat. No. 1,618,549, issued to O'Toole taught rotational paddle plates that were sprocket driven with a sprocket gear affixed to a rigid axle of a wind wheel. In 1867, U.S. Pat. No. 69,374, issued to Thornton, taught a wind wheel with a stationary planetary sprocket gear that rotated sprocket gears on axles to which paddle plates were attached.

Positioning a return-rotational portion of a wind wheel below or behind a surface was taught by other patents to direct wind against only a portion of the wind wheel that traveled with the wind. Included in this type of wind wheel were U.S. Pat. No. 5,472,311, that was issued to Davis; U.S. Pat. No. 5,348,443, that was issued to Roberts; and U.S. Pat. No. 4,678,394, that was issued to Willoughby.

SUMMARY OF THE INVENTION

In light of need for improvement of wind wheels, objects of this invention are to provide a wind wheel with rotationally faced plates which:

Can operate effectively in low wind speeds and at hurricane-level speeds of wind due to low mass bearing per size of paddle plates on low-friction axles and low non-resistant airfoil structures that can be built into the system;

Adjusts to wind direction;

Has low construction and maintenance costs;

Can be operated with a vertical or a horizontal axis;

Has full-facing contact with wind for maximum efficiency; and

Can be constructed in kit form for ease of assembly.

This invention accomplishes these and other objectives with a wind wheel having at least one planetary gear wheel affixed rigidly to a wind-wheel axle from which gear trains for each of a plurality of wind-wheel plates are rotated to maximum plate frontage in wind path by gear belts intermediate the gear trains and axes of the plurality of wind-wheel plates. The gear trains each have a second gear wheel with a 0.50-to-1.0 gearing ratio to the planetary gear, a third gear wheel with a 2.0-to-1.0 gearing ratio to the planetary gear, a first belt gear extended concentrically from a side of the third gear and having a 0.60-to-1.0 gearing ratio to the planetary gear and, a second belt gear having a gearing ratio that is equal to the first belt gear. A design plurality of planetary-gear teeth are extended radially outward from an outside periphery of the planetary gear wheel and are meshed with second-gear teeth that are extended outward radially from an outside circumferential periphery of the second gear that has a diameter that is substantially 50 percent of a diameter of the planetary gear wheel. Third-gear teeth are extended outward radially from the third gear and meshed with the second-gear teeth on the second gear wheel. A gear belt is positioned snugly on the first belt gear and on the second belt gear. The second gear is rotatable on a second-gear axle that is attached to a hub section of the wind wheel. The third gear and the first belt gear that is extended concentrically from the third gear are rotatable on a first gear-belt axle that is attached to the hub section of the wind wheel at a position radially outward from the second-gear axle. The second belt gear is attached to an axle of a wind-wheel plate proximate an outside circumferential periphery of the wind wheel.

The plurality of wind-wheel plates with corresponding drive trains is preferably six but can be any number appropriate for design preferences.

The wind wheel can be structured with either a horizontal axis or a vertical axis with appropriate structural modifications.

Directional control can be provided by eccentric positioning of the wind-wheel axis in order for the wind-wheel plates to have a weather-vane effect.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF DRAWINGS

This invention is described by appended claims in relation to description of a preferred embodiment with reference to the following drawings which are described briefly as follows:

FIG. 1 is a partially cutaway side elevation view showing wind-wheel plates positioned optimally for facing into wind and rotating the wind wheel down wind on a pivot platform;

FIG. 2 is a partially cutaway front elevation view of the FIG. 1 illustration;

FIG. 3 is a partially cutaway top view of the FIG. 1 illustration;

DESCRIPTION OF PREFERRED EMBODIMENT

Figure 4:
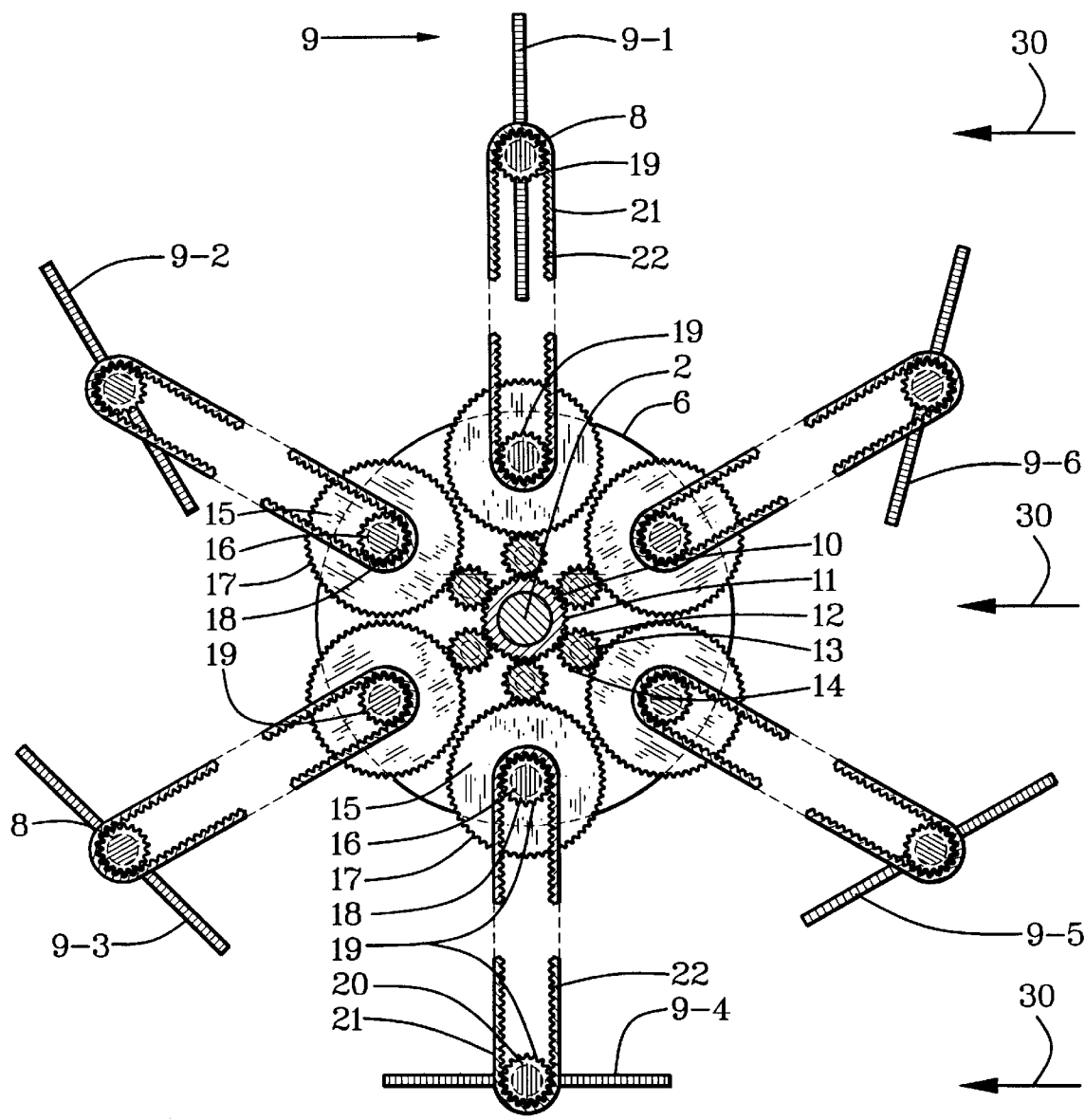
FIG. 4 is a partially cutaway sectional side view of a plurality of gear trains that rotate wind-wheel plates through gear belts.

For purposes of describing the preferred embodiment, the terminology used in reference to the numbered components in the drawings is as follows:

| | |
|---|---|
| 1. wind wheel | 17. third-gear teeth |
| 2. wind-wheel axle | 18. first gear-belt wheel |
| 3. axle supports | 19. gear-belt-wheel teeth |
| 4. frame | 20. second gear-belt wheel |
| 5. platform | 21. gear belt |
| 6. wind-wheel hub | 22. gear-belt teeth |
| 7. wind-wheel spoke | 23. adjustable attachment |
| 8. plate axle | 24. adjustment bolt |
| 9. wind-wheel plates 9-1-to-9-6 | 25. adjustment slot |
| | 26. thrust bearing |
| 10. planetary gear wheel | 27. wheels |
| 11. first-gear teeth | 28. up-wind tongue |
| 12. second gear wheel | 29. wind-wheel rim |
| 13. second-gear axles | 30. wind flow |
| 14. second-gear teeth | 31. belt-wheel set screw |
| 15. third gear wheels | 32. belt-wheel hub |
| 16. first belt-wheel axles | |

Reference is made first to FIGS. 1–5. A wind wheel 1 is rotative on a wind-wheel axle 2 that is affixed to a wind-wheel base that is bifurcated with axle supports 3 at opposite sides of a frame 4 which is rotative on a platform 5. A wind-wheel hub 6 is rotational on the wind-wheel axle 2.

A plurality of wind-wheel spokes 7 is extended outward radially from the wind-wheel hub 6. A plate axle 8 is attached to each of the wind-wheel spokes 7 and a wind-wheel plate 9 is attached centrally to the plate axles 8. An equal portion of each of a plurality of wind-wheel plates 9 is positioned on each side of the plate axles 8 respectively.

The wind-wheel plates 9 are shown in rotating circumferential positions on the wind wheel 1. For ease of reference, a wind-wheel plate 9 at a top position is designated as 9-1 and successive positions of the wind-wheel plate 9 counterclockwise on the wind wheel 1 are designated successively 9-2, 9-3, 9-4, 9-5 and 9-6. A wind-wheel plate 9-4 is at a bottom. Wind-wheel plates 9-2 and 9-3 are on down-wind sides of the wind-wheel axle 2 and wind-wheel plates 9-5 and 9-6 are on up-wind sides of the wind-wheel axle 2.

From a front view in FIG. 2, the wind-wheel plate 9-2 is hidden by wind-wheel plate 9-6 and by wind-wheel plate 9-1. From a top view in FIG. 3, part of wind-wheel plate 9-3 is hidden by wind-wheel plate 9-2 and part of wind-wheel plate 9-5 is hidden by wind-wheel plate 9-6.

The wind-wheel axle 2 is stationary and a section of wind-wheel hub 6 rotates on opposite sides of at least one planetary gear wheel 10 having a unit plurality of first-gear teeth 11 extended radially outward from an outside circumferential periphery of the planetary gear wheel 10. Sizes and corresponding numbers of gear teeth on gear wheels of a plurality of gear trains intermediate the planetary gear wheel 10 and a plurality of plate axles 8 cause the wind-wheel plates 9 to face wind in down-wind rotational travel and not to face wind in up-wind rotational travel.

The unit plurality of first-gear teeth 11 is a plurality to which other pluralities of gear teeth in the gear trains relate. All of the other pluralities of gear teeth are a fraction or a multiple of the unit plurality of first-gear teeth 11 on the planetary gear wheel 10.

Figure 5:
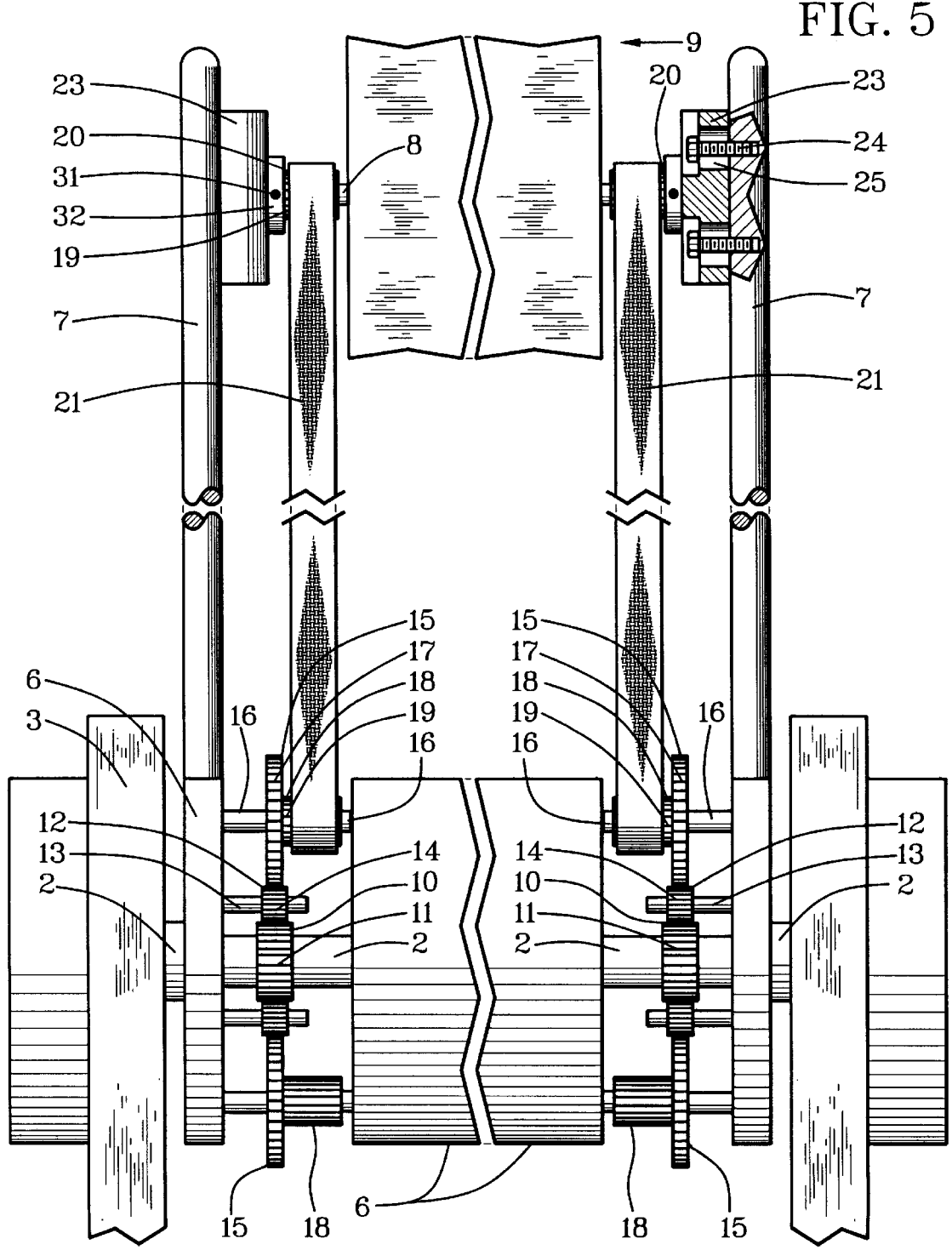
FIG. 5 is a partially cutaway sectional front view of the plurality of gear trains shown in FIG. 4.

Referring primarily to FIGS. 4–5, the unit plurality of first-gear teeth 11, therefore, is 1.0. A plurality of second gear wheels 12 are rotative on a corresponding plurality of second-gear axles 13 that are affixed to an internal portion of the wind-wheel hub 6 and have second-gear teeth 14 extended outwardly from outside circumferential peripheries of the second gear wheels 12. The second-gear teeth 14 have a plurality of 0.5-to-1.0 of the unit plurality of first-gear teeth 11 on the planetary gear wheel 10. The second gear wheels 12 correspondingly are one-half of a diameter of the planetary gear wheel 10. Second-gear teeth 14 are meshed with first-gear teeth 11 inwardly from the second-gear axles 13.

A plurality of third gear wheels 15 are rotative respectively on a plurality of first belt-wheel axles 16 that are affixed to an external portion of the wind-wheel hub 6 and have third-gear teeth 17 extended outwardly from outside circumferential peripheries of the third gear wheels 15. The third-gear teeth 17 have a plurality of 2.0-to-1.0 of the unit plurality of the first-gear teeth 11 on the planetary gear wheel 10 and are meshed with the second-gear teeth 14 inwardly on the second gear wheel 12.

A plurality of first gear-belt wheels 18 are extended concentrically from sides of the third gear wheels 15. Gear-belt-wheel teeth 19 on the plurality of first gear-belt wheels 18 have a plurality of 0.6-to-1.0 of the unit plurality of the first-gear teeth 11 on the planetary gear wheel 10. Gear-belt-wheel teeth 19 on the second gear-belt wheels 20 also have a same plurality of 0.6-to-1.0 of the unit plurality of the first gear teeth 11 on the planetary gear wheel 10.

A plurality of gear belts 21 having gear-belt teeth 22 matching the gear-belt wheel teeth 19 are positioned on the first gear-belt wheels 18 and the second gear-belt wheels 20.

The second gear-belt wheels 20 are affixed to the plate axles 8 which rotate on an adjustable attachment 23 to the wind-wheel spokes 7. The adjustable attachments 23 are adjustable linearly inward and outward for adjustment of tension of the gear belts 21 intermediate the first gear-belt wheels 18 and the second gear-belt wheels 20.

A variety of adjustable attachments 23 are foreseeable. Adjustment bolts 24 in adjustment slots 25 of a slide attachment are representative of other adjustable attachments 23 that can be employed.

Figure 6:
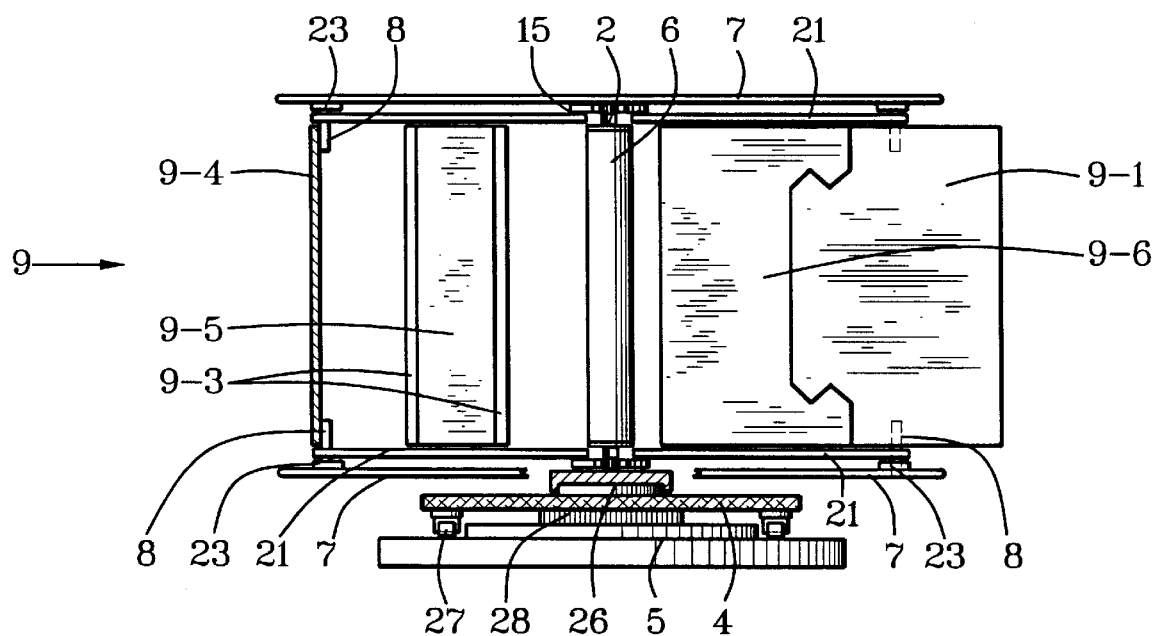
FIG. 6 is a partially cutaway side elevation view of an embodiment having a vertical wind-wheel axle and showing wind-wheel plates positioned optimally for facing into wind and for rotating the wind wheel down wind on wheels that ride on a pivot platform.
Figure 7:
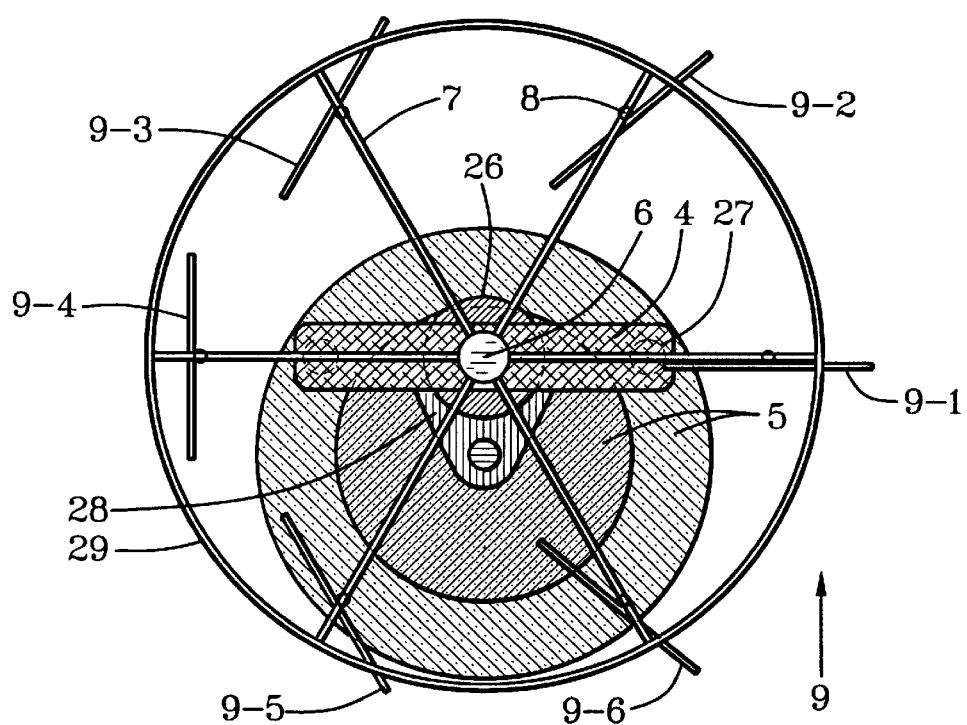
FIG. 7 is a top view of the FIG. 6 illustration.

Referring to FIGS. 6–7, the wind-wheel axle 2, the wind-wheel hub 6 and the plate axles 8 can be vertical for a side embodiment with a thrust bearing 26 on the frame 4. Similar to the embodiment with a horizontal wind-wheel axle 2 described in relation to FIGS. 1–3, wheels 27 on the frame 4 can ride on the platform 5. An up-wind tongue 28 is attached rigidly to the frame 4 and attached rotatively to the platform 5 as a direction controller.

As shown in FIGS. 1 and 7, the wind-wheel spokes 7 can be joined at distal ends with a wind-wheel rim 29. The wind-wheel rim 29 can be circumferential as shown or straight between distal ends of the wind-wheel spokes 7. Straight sections between distal ends of the wind-wheel spokes 7 provide triangular structure for some use conditions.

In FIGS. 1 and 4, wind flow 30 is represented by arrows.

Referring further to FIG. 5, each second gear-belt wheel 20 can be adjusted circumferentially on each plate axle 8 with a belt-wheel set screw 31, or similar circumferential setting means, in a belt-wheel hub 32 of each second gear-belt wheel 20. Circumferential fixing of the second gear-belt wheel 20 on each plate axle 8 fixes rotational positioning of each wind-wheel plate 9 relative to other wind-wheel plates 9 and relative to their rotational gearing.

A new and useful wind wheel having been described, all such foreseeable modifications, adaptations, substitutions of equivalents, mathematical possibilities of combinations of parts, pluralities of parts, applications and forms thereof as described by the following claims and not precluded by prior art are included in this invention.

I claim:

1. A wind wheel comprising:

at least one planetary gear wheel affixed rigidly to a wind-wheel axle that is affixed to a wind-wheel base;

at least one wind-wheel hub that is rotational on the wind-wheel axle;

a plurality of wind-wheel spokes extended outward radially from the wind-wheel hub;

the plurality of wind-wheel spokes each having a plate axle and comprising a plurality of plate axles proximate plate ends of the wind-wheel spokes;

a plurality of wind-wheel plates that are positioned centrally on the plate axles;

each of a plurality of wind-wheel plates being rotatable on a plate axle;

a plurality of first gear-belt wheels that are rotatable on first belt-wheel axles proximate an outside-circumferential portion of the wind-wheel hub in line with the plurality of plate axles on the wind-wheel spokes respectively;

a plurality of second gear-belt wheels that are affixed to the plurality of plate axles respectively;

a plurality of gear belts positioned on the plurality of first gear-belt wheels and on the plurality of second gear-belt wheels;

gear-belt teeth of the plurality of gear belts being meshed with gear-belt wheel teeth on the plurality of first gear-belt wheels;

the gear-belt teeth of the plurality of gear belts being meshed with gearbelt-wheel teeth on the plurality of second gear-belt wheels;

a plurality of gears in gear trains having design gear ratios intermediate the planetary gear wheel and the plurality of second gear-belt wheels respectively for rotating the plurality of wind-wheel plates to face wind in down-wind rotational travel of the plurality of wind-wheel plates and for rotating the plurality of wind-wheel plates to avoid facing the wind in up-wind rotational travel of the plurality of wind-wheel plates on the wind wheel; and a wind direction follower attached to the wind-wheel base.

2. A wind wheel as described in claim 1 wherein:

the plurality of gears in gear trains having design gear ratios intermediate the planetary gear wheel and the plurality of second gear-belt wheels has a planetary gear wheel with a unit plurality of first-gear teeth extended radially outward from an outside circumferential periphery of the planetary gear wheel;

a plurality of second gear wheels are rotative on a corresponding plurality of second-gear axles that are affixed to an internal portion of the wind-wheel hub and have second-gear teeth extended outwardly from outside circumferential peripheries of the second gear wheels;

the second-gear teeth have a plurality of 0.5-to-1.0 of the unit plurality of first-gear teeth on the planetary gear wheel and are meshed with the first-gear teeth on the planetary gear wheel;

a plurality of third gear wheels are rotative respectively on a plurality of first belt-wheel axles that are affixed to an external portion of the wind-wheel hub and have third-gear teeth extended outwardly from outside circumferential peripheries of the third gear wheels;

the third-gear teeth have a plurality of 2.0-to-1.0 of the unit plurality of the first-gear teeth on the planetary gear wheel and are meshed with the second-gear teeth on the plurality of second gear wheels;

the plurality of first gear-belt wheels are extended concentrically from sides of the third gear wheels;

the gear-belt-wheel teeth on the plurality of first gear-belt wheels have a plurality of 0.6-to-1.0 of the unit plurality of first-gear teeth on the planetary gear; and the gear-belt-wheel teeth on the plurality of second gear-belt wheels have a plurality of 0.6-to-1.0 of the unit plurality of the first-gear teeth on the planetary gear.

3. A wind wheel as described in claim 2 wherein:

the wind-wheel axle is positioned horizontally;

the wind-wheel base is bifurcated with vertical supports at opposite sides of the wind wheel;

wind-wheel hubs at opposite sides of the wind wheel are attached rotationally to the vertical supports at opposite sides of the wind wheel; and the wind-wheel base has a horizontal frame attached to bottom portions of the vertical supports.

4. A wind wheel as described in claim 3 wherein:

the horizontal frame rests on wheels that ride on a platform;

an up-wind tongue is extended from a center of the horizontal frame and attached rotationally to the platform; and wind pressure against surfaces of the wind-wheel plates is off-centered from pivotal attachment of the up-wind tongue to the horizontal frame to rotate the wind wheel down wind from rotational attachment to the platform.

5. A wind wheel as described in claim 2 wherein:

the wind-wheel axle is positioned vertically; and the wind-wheel hub has a thrust bearing in rotational contact with a wind-wheel base.

6. A wind wheel as described in claim 5 wherein:

the wind-wheel base is positioned on wheels that ride on a platform;

the wind-wheel base is off-centered from a center of the platform; and an up-wind tongue is extended intermediate a center of the wind-wheel base and a pivotal attachment of the up-wind tongue to the center of the platform.

7. A wind wheel as described in claim 1 wherein:

the plurality of wind-wheel axles rotate on adjustable attachments to the plurality of wind-wheel spokes; and the adjustable attachments are adjustable linearly inward and outward on the wind-wheel spokes for adjustment of tension of the plurality of gear belts intermediate the first gear-belt wheels and the second gear-belt wheels.

8. A wind wheel as described in claim 2 wherein:

the plurality of wind-wheel axles rotate on adjustable attachments to the plurality of wind-wheel spokes; and the adjustable attachments are adjustable linearly inward and outward on the wind-wheel spokes for adjustment of tension of the plurality of gear belts intermediate the first gear-belt wheels and the second gear-belt wheels.

9. A wind wheel comprising:

at least one planetary gear wheel affixed rigidly to a first wind-wheel axle that is affixed to a first side of a wind-wheel base;

at least one planetary gear wheel affixed rigidly to a second wind-wheel axle that is affixed to a second side of the wind-wheel base;

a first wind-wheel hub that is rotational on a first wind-wheel axle on the first side of the wind-wheel base;

a second wind-wheel hub that is rotational on a second wind-wheel axle on the second side of the wind-wheel base;

a plurality of first wind-wheel spokes extended outward radially from the first wind-wheel hub;

a plurality of second wind-wheel spokes extended outward radially from the second wind-wheel hub;

the plurality of first wind-wheel spokes and the plurality of second wind-wheel spokes each having a plate axle and comprising a plurality of plate axles proximate plate ends of the first wind-wheel spokes and the second wind-wheel spokes;

a plurality of wind-wheel plates that are positioned centrally on the plate axles;

the plate axles being rotatable on wind-wheel spokes;

a plurality of first gear-belt wheels that are rotatable on first belt-wheel axles proximate outside-circumferential portions of the first wind-wheel hub and the second wind-wheel hub in line with the plurality of plate axles on the first wind-wheel spokes and on the second wind-wheel spokes respectively;

a plurality of second gear-belt wheels that are affixed to the plurality of plate axles respectively;

a plurality of gear belts positioned on the plurality of first gear-belt wheels and the plurality of second gear-belt wheels;

gear-belt teeth of the plurality of gear belts being meshed with gear-belt wheel teeth on the plurality of first gear-belt wheels;

the gear-belt teeth of the plurality of gear belts being meshed with gear-belt-wheel teeth on the plurality of second gear-belt wheels;

a plurality of gears in gear trains having design gear ratios intermediate planetary gear wheels and the plurality of second gear-belt wheels respectively for rotating the plurality of wind-wheel plates to face wind in down-wind rotational travel of the plurality of wind-wheel plates and for rotating the plurality of wind-wheel plates to avoid facing the wind in up-wind rotational travel of the plurality of wind-wheel plates on the wind wheel; and a wind direction follower attached to the wind-wheel base.

10. A wind wheel as described in claim 9 wherein:

the plurality of gears in gear trains having design gear ratios intermediate the planetary gear wheel and the plurality of second gear-belt wheels has a planetary gear wheel with a unit plurality of first-gear teeth extended radially outward from an outside circumferential periphery of the planetary gear wheel;

a plurality of second gear wheels are rotative on a corresponding plurality of second-gear axles that are affixed to an internal portion of the wind-wheel hub and have second-gear teeth extended outwardly from outside circumferential peripheries of the second gear wheels;

the second-gear teeth have a plurality of 0.5-to-1.0 of the unit plurality of first-gear teeth on the planetary gear wheel and are meshed with the first-gear teeth on the planetary gear wheel;

a plurality of third gear wheels are rotative respectively on a plurality of first belt-wheel axles that are affixed to an external portion of the wind-wheel hub and have third-gear teeth extended outwardly from outside circumferential peripheries of the third gear wheels;

the third gear teeth have a plurality of 2.0-to-1.0 of the unit plurality of the first-gear teeth on the planetary gear wheel and are meshed with the second-gear teeth on the plurality of second gear wheels;

the plurality of first gear-belt wheels are extended concentrically from sides of the third gear wheels;

the gear-belt-wheel teeth on the plurality of first gear-belt wheels have a unit plurality of 0.6-to-1.0 of the unit plurality of first-gear teeth on the planetary gear; and the gear-belt-wheel teeth on the plurality of second gear-belt wheels have a unit plurality of 0.6-to-1.0 of the unit plurality of the first-gear teeth on the planetary gear.

11. A wind wheel as described in claim 10 wherein:

the wind-wheel axle is positioned horizontally;

the wind-wheel base is bifurcated with vertical supports at opposite sides of the wind wheel;

wind-wheel hubs at opposite sides of the wind wheel are attached rotationally to the vertical supports at opposite sides of the wind wheel; and the wind-wheel base has a horizontal frame attached to bottom portions of the vertical supports.

12. A wind wheel as described in claim 11 wherein:

the horizontal frame rests on wheels that ride on a platform;

an up-wind tongue is extended from the horizontal frame and attached pivotally to the platform; and wind pressure against surfaces of the wind-wheel plates is off-centered from pivotal attachment of the up-wind tongue to the horizontal frame to rotate the wind wheel down wind from the platform on the wheels that ride on the platform.

13. A wind wheel as described in claim 10 wherein:

the wind-wheel axle is positioned vertically; and the wind-wheel hub has a thrust-bearing in rotational contact with the wind-wheel base.

14. A wind wheel as described in claim 13 wherein:

the wind-wheel base is positioned on wheels that ride on a platform;

the wind-wheel base is off-centered from a center of the platform; and an up-wind tongue is extended intermediate the wind-wheel base and a pivotal attachment of the up-wind tongue to the platform.

15. A wind wheel as described in claim 9 wherein:

the plurality of wind-wheel axles rotate on adjustable attachments to the plurality of wind-wheel spokes; and the adjustable attachments are adjustable linearly inward and outward on the wind-wheel spokes for adjustment of tension of the plurality of gear belts intermediate the first gear-belt wheels and the second gear-belt wheels.

* * * * *